C. JOHNSON.
MILK CAN COVER AND TAG HOLDER.
APPLICATION FILED SEPT. 13, 1912.

1,053,291.

Patented Feb. 18, 1913.

WITNESSES:
O. E. Carlsen.
E. C. Carlsen.

INVENTOR:
Curtis Johnson.
BY his ATTORNEY:
A. M. Carlsen.

UNITED STATES PATENT OFFICE.

CURTIS JOHNSON, OF RIVER FALLS, WISCONSIN.

MILK-CAN-COVER AND TAG HOLDER.

1,053,291.     Specification of Letters Patent.     Patented Feb. 18, 1913.

Application filed September 13, 1912. Serial No. 720,195.

*To all whom it may concern:*

Be it known that I, CURTIS JOHNSON, a citizen of the United States, residing at River Falls, in the county of Pierce and State of Wisconsin, have invented a new and useful Milk-Can-Cover and Tag Holder, of which the following is a specification.

My invention relates to devices for holding the cover on to milk cans and at the same time holding to the cover a shipping tag or an envelop serving as shipping tag and also to carry within it the invoice of the shipment, all in an easily detachable manner.

Figure 1:
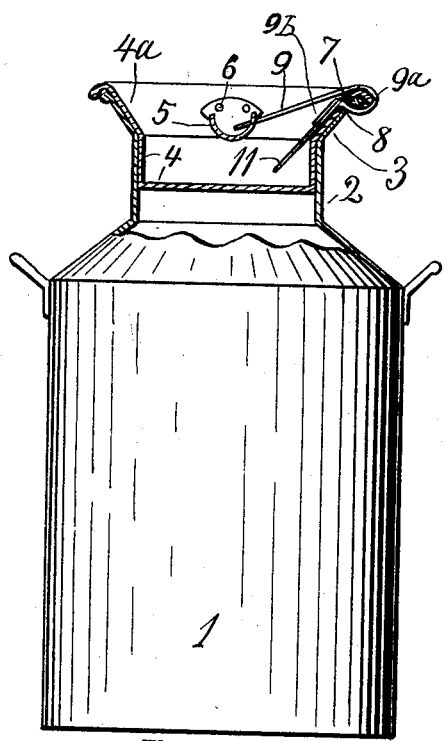
Figure 3:
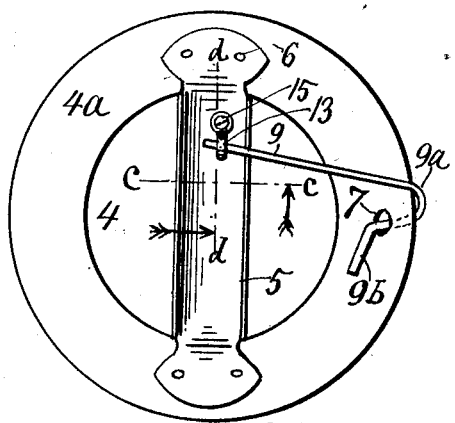
Figure 4:
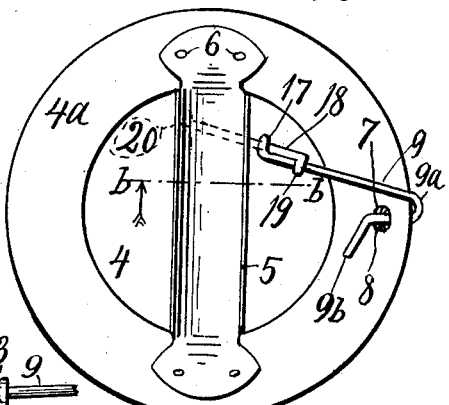
Figure 2:
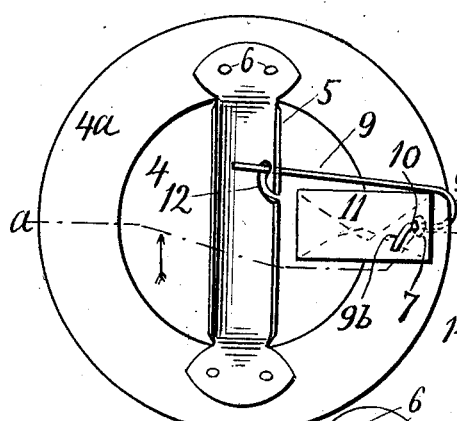
Figure 6:
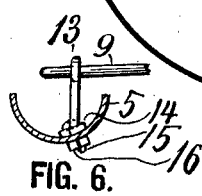
Figure 7:
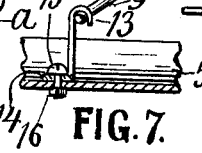
Figure 8:
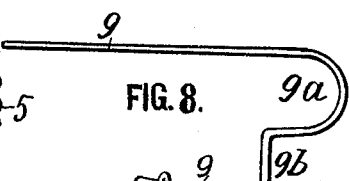
Figure 9:
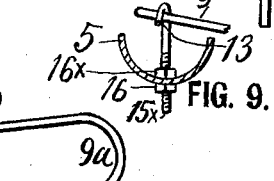
Figure 5:
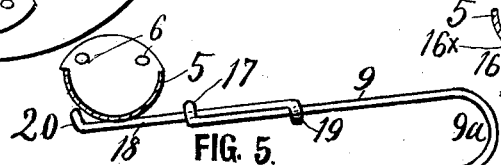

In the accompanying drawing, Figure 1 is a partly sectional side elevation of a milk can provided with my improved cover and tag holder, the neck and top of the can being shown in section on the line $a$—$a$ Fig. 2. Fig. 2 is an enlarged top view of the top and neck of the can shown in Fig. 1. Figs. 3 and 4 are modifications of Fig. 2 with the tag omitted. Fig. 5 is a section on the line $b$—$b$ Fig. 4, with only the handle of the cover and the fastener shown. Fig. 6 is a section on the line $c$—$c$ Fig. 3 mainly of the handle of the cover and showing a portion of the fastening device. Fig. 7 is a section on the line $d$—$d$ Fig. 3. Fig. 8 is a detail side view of the main member of the cover and tag holding device. Fig. 9 is a modification of Fig. 6.

Referring to the drawing by reference numerals, 1 designates an ordinary milkcan, in whose neck 2 and flaring top 3 a dished or cup-shaped cover 4 is fitted. Said cover is provided with a diametrically disposed handle 5 of about semicylindrical form and secured at 6 to the cover. The flaring portion $4^a$ of the cover also has an aperture 7 registering with an aperture 8 in the flaring portion 3 of the can.

Heretofore it has been customary to insert a light soft wire through the apertures 7 and 8 and sometimes also through a shipping tag and then tying the ends of the wire together in such a manner that it is apt to injure the hands of persons handling the cans, and by tying and untying the wire several times, its usefulness is destroyed and while the wire lasts it usually leaves the can cover considerable vertical play and also leaves the tag free to swing on the wire and get beyond the can where it is easily injured or even torn away. To overcome these difficulties and defects, I provide a spring wire of about the shape shown in Fig. 8 having a long arm 9, a loop $9^a$ and a short arm $9^b$ at about right angle to the long arm. In the use of the device the short arm $9^b$ is inserted through the apertures 8 and 7 and then through the apertures 10 of a tag or envelop 11, as shown in Figs. 2 and 1, and as the long arm 9 is then sprung into a holding notch 12 in the handle of the cover, the short arm $9^b$ pinches the tag against the inner face of the flaring portion of the cover and thus holds the tag firmly in place within the cover, and the cover firmly down on the can by bearing at the upper edge of it by the same loop $9^a$ that engages the upper edge of the aperture 8 in the flaring part of the can top. When the tag, or the cover, or both of them, are to be removed, the arm 9 is simply sprung or forced sidewise out of the notch 12.

On can covers already manufactured it would be difficult to provide the notch 12, for that reason I provide the modification shown in Figs. 3, 6 and 7, consisting of a hook 13 having an eye 14 secured by a bolt 15 and nut 16 to the handle 5, and letting the wire arm 9 engage in said hook.

Another modification is shown in Figs. 4 and 5, in this modification the handle 5 is left intact and the wire 9 is given an eye 17 in which slides an extension piece 18 having an eye 19 sliding on the arm 9, the free end of said extension is formed with a short hook 20 which engages the under side of the handle, as shown in Fig. 5, and prevents accidental disengagement of the arm from the handle until the extension piece 18 is slid endwise away from under the handle.

In Fig. 9 the hook 13 is adjustable up and down for large and small handles, by having its shank $15^x$ threaded and provided with two nuts 16, $16^x$.

What I claim is:—

The combination with a milk-can having a flaring neck with an aperture near one edge thereof, of a dished can cover having a flaring portion adapted to rest upon the flared neck of the can and a handle fixed diametrically across the dished portion of the cover, said portion having an aperture adapted to register with the first mentioned aperture, a spring wire member having a loop or bend adapted to engage in said apertures, and at one end thereof an arm adapted for engagement with the handle of the cover, and at the other end of the loop a shorter arm arranged to automatically press upon the inner face of the flared portion of the cover when the longer arm is engaged by the handle, whereby the short arm is adapted to hold a tag or other paper placed on it, and the entire wire member to hold the cover secured on the can, and means facilitating the engagement of the arm with the handle.

In testimony whereof I affix my signature, in presence of two witnesses.

CURTIS JOHNSON.

Witnesses:
CAESAR E. SPILLCKE,
JAY H. GRIMM.

Copies of this patent may be obtained for five cents each, by addressing the "Commissioner of Patents, Washington, D. C."